United States Patent
Soloboev et al.

(10) Patent No.: US 10,833,533 B2
(45) Date of Patent: Nov. 10, 2020

(54) INDUSTRIAL SYSTEM FOR ENERGY STORAGE

(71) Applicant: Limited liability company "Energozapas", Moscow (RU)

(72) Inventors: Sergey Vladimirovich Soloboev, Novosibirsk (RU); Andrey Andreevich Bryzgalov, Novosibirsk (RU)

(73) Assignee: LIMITED LIABILITY COMPANY "ENERGOZAPAS", Moscow (RU)

( * ) Notice: Subject to any disclaimer, the term of this patent is extended or adjusted under 35 U.S.C. 154(b) by 130 days.

(21) Appl. No.: 16/233,476

(22) Filed: Dec. 27, 2018

(65) Prior Publication Data

US 2020/0044481 A1 Feb. 6, 2020

(51) Int. Cl.
| | | |
|---|---|---|
| *H02J 15/00* | (2006.01) | |
| *B60L 55/00* | (2019.01) | |
| *B61C 3/00* | (2006.01) | |
| *B61C 17/06* | (2006.01) | |
| *H02K 7/18* | (2006.01) | |

(52) U.S. Cl.
CPC ............. *H02J 15/00* (2013.01); *B60L 55/00* (2019.02); *B61C 3/00* (2013.01); *B61C 17/06* (2013.01); *H02J 15/007* (2020.01); *H02K 7/1807* (2013.01); *B60L 2200/30* (2013.01)

(58) Field of Classification Search
CPC ................................. H02J 15/00; H02J 15/007
See application file for complete search history.

(56) References Cited

U.S. PATENT DOCUMENTS

| | | | |
|---|---|---|---|
| 7,973,420 B2* | 7/2011 | Scott | F03G 3/00 290/1 R |
| 8,593,012 B2 | 11/2013 | Peitzke et al. | |
| 9,903,391 B2 | 2/2018 | Heindl | |
| 10,683,851 B2* | 6/2020 | Pedretti | B66C 13/28 |
| 2009/0193808 A1* | 8/2009 | Fiske | F03D 9/25 60/721 |
| 2016/0138572 A1* | 5/2016 | Boone | F03G 3/00 290/1 A |
| 2017/0288457 A1* | 10/2017 | Peitzke | F03G 3/00 |

FOREIGN PATENT DOCUMENTS

| | | |
|---|---|---|
| CN | 206555081 U | 10/2017 |
| GB | 2509437 A | 7/2017 |
| GB | 2549743 A | 11/2017 |
| WO | 2011146780 A2 | 11/2011 |

* cited by examiner

*Primary Examiner* — Adi Amrany
(74) *Attorney, Agent, or Firm* — Muncy, Geissler, Olds & Lowe, P.C.

(57) ABSTRACT

The present disclosure is directed to a system for electric energy storage. The system includes at least one energy cell. The energy cell has a plurality of weights, a carriage, a trolley, a belt and a main drive. The system is configured to move vertically the weights and to store the weights on either an upper portion or a lower portion of the energy cell. The system is charged or discharged by moving the weights from the lower portion to the upper portion or from the upper portion to the lower portion. The present disclosure also provides for a method for electric energy storage.

16 Claims, 7 Drawing Sheets

INDUSTRIAL SYSTEM FOR ENERGY STORAGE

BACKGROUND OF THE INVENTION

Field of the Invention

The present disclosure relates to an electric energy storage. In particular, the present invention provides an industrial system for electric energy storage by employing vertical movement of weights.

Description of the Background Art

It is well known that the electric power grid is not able to store electric energy without the use of an energy storage system. The modern electric power systems are increasingly complex and the matching of power generation supply with power usage is a critical element in maintaining stability in operation of the systems.

The demand for electricity generation over a typical twenty-four hour period changes significantly due to the differences in electricity consumption. For example, a common scenario that during morning and evening hours the consumption of electricity is increased (peak hours) and during night hours the consumption is minimal (off-peak hours). Accordingly, the difficult task of maintaining a balance between generated and consumed electric power exists in the large power systems. In other words, it is necessary for a system operator to dispatch and/or alter electricity generation assets to match the changes in demand.

The imbalance between the generated and consumed power leads to deterioration of the quality of the electrical energy supplied. For example, the imbalance between the generated and consumed power can cause changes in the frequency or/and voltage of the alternating current, which can lead to serious failures of the power system equipment.

Maneuverable power plants, for example, hydroelectric power stations and/or gas turbine plants, have been used to compensate for the imbalance between the demand and consumption of electricity in the large power system. The use of such maneuverable power plants allows, in a short time (e.g., few minutes) to change the electricity generation capacity with minimum efficiency and resource loss.

However, the use of the maneuverable power plants is generally limited. For example, the hydroelectric power stations require a specific terrain. Capital cost of other maneuverable power plants significantly exceeds capital cost of the similar constant power plants, and efficiency remarkably drops when exiting the constant power mode. Moreover, continued use of the power plants at the variable capacity usually causes premature deterioration of the equipment.

Industrial power storage systems in turn allow accumulating of surplus power generated during off-peak periods and provide additional power during peak periods.

This issue for addressing the imbalance is becoming more complicated with the expansion of use of alternative (e.g. renewable) energy sources, such as wind power and solar power plants that have inherent issues with consistency of power production because the production depends on unpredictable and uncontrollable environmental conditions.

If renewable energy source (RES), whether it is solar or wind power, is used in an isolated electric grid without an energy storage system it is accidental that at any given moment RES' power production correlates with its consumption. Accordingly, in most cases this is not the case, and results in discharge of excess electrical power or in power surges, which greatly affect the efficiency of the power system.

As a rule, energy producers use the equipment with knowingly surplus capacity relatively to the actual energy demand to provide the electric grid with the amount of energy precisely matching the instantaneous demand to guarantee spare energy by increasing capital and operating costs. This method proved effective in comparison to traditional power plants, however, in case of RES, it does not guarantee the required amount of energy in the event of unfavorable weather conditions.

Accordingly, the need for industrial scale energy storage as a portion of the power supply system is driven by economic efficiency and increasing requirements for daily load shifting and power quality services, including frequency regulation, voltage control and regulation, spinning reserve, non-spinning reserve, black start.

Electrical energy storage may be accomplished using mechanical (pumped hydroelectric storage, compressed air energy storage and flywheels), electrochemical (conventional rechargeable batteries and flow batteries), electrical (capacitors, supercapacitors and superconducting magnetic energy storage), thermochemical (solar fuels), chemical (power-to-gas) and thermal (sensible heat storage and latent heat storage) energy storages.

For the purpose of accumulating energy at the scale of the power system (rated power from 100 MW and above, charge/discharge duration at rated power from an hour and above) lithium-ion batteries, compressed air and pumped hydro power plants are commonly used.

According to DOE Global Energy Storage Database today 98% of the world's storage capacities is pumped hydroelectric storages (PHS). In PHS, water is pumped from a lower elevation reservoir to a higher elevation when charging; the stored water is then released through turbines to convert the stored energy into electricity upon demand when discharging.

For the construction of a cost-effective (competitive in terms of costs) PHS, there is a need for a suitable area, which provides a height difference of the required height (hundreds of meters), and the lower and upper surfaces being adapted for flooding or have natural water bodies. The energy intensity of the PHS is linearly dependent on the volume of water body, which ultimately leads to a requirement of a large area of land being available for construction. The operation of the plant is also associated with a number of risks, among them the main ones are a possibility of large-scale damage in the event of an accident and a negative impact on the environment.

In Compressed Air Energy Storages (CAES), the air is compressed under high pressure and pumped into a storage (as a rule, a natural underground cavern) when charging. In the discharging stage, the compressed air is heated, expanded and rotates the gas turbine to produce electricity.

To use CAES, the natural underground cavern appropriate for storage of pressurized air has to be located near the energy production and consumption system in a technologically and economically developed region. This is because the use of artificial reservoirs leads to an increase in capital costs and a reduced economic competitiveness. While the technology has been developed since the 1970s, there are only two Compressed Air Energy Storages with the capacity of over 10 MW operating worldwide.

Lithium-ion batteries are commonly used in household but also have recently got an application as industrial energy storages. In the charging stage, lithium ions are inserted into the anode material through external electric field. When the external charging field is removed, and a load is connected to the battery, lithium ions move back to the cathode material (to a low concentration area) while electricity flows through the load.

An important disadvantages of industrial storage devices that use lithium-ion batteries is a combination of relatively low durability with high capital costs, which ultimately leads to the problem of cost-effectiveness. High capital costs for industrial lithium-ion batteries drives the need to achieve the required power by using a large number of low-power cells. Further, the surface of the battery increases with increasing power more slowly than the generated by the battery heat, which leads to a decrease in efficiency. Thus, the possibility of using large lithium-ion cells is limited by the efficiency. Finally, due to the rise in prices for raw lithium, the prospects for the use of the lithium-ion battery storage devices on an industrial scale are controversial.

There are some systems that like PHS use gravitational field of the earth for energy storage. Such gravity storage devices are based on regenerative lifting devices raising weights against the force of gravity For example, U.S. Pat. No. 9,903,391 B2 to Heindle discloses a system for storing potential energy that includes a hydraulic cylinder, a weight to be lifted, and a sealing ring at the edge of the weight to be lifted. The hydraulic cylinder is formed by the cavity between surrounding rocks and the cut-out solid rock. The cavity is sealed with respect to the surrounding rocks by the sealing ring. This system sets specific requirements for the location area as it requires solid granite foundation with the volume of over hundreds of thousands cubic meters and access to a large amount of water.

U.S. Pat. No. 8,593,012 B2 to Peitzke et al., discloses electric power storage system employing electrically driven rail cars carrying off weights between lower and upper storage facilities for gravitational energy storage by employing electrical grid power to the cars for transport of the weights from the lower to upper storage facility and gravitational energy recovery and return to the electrical grid by electromagnetic regenerative braking of the cars during transport of the weights from the upper to lower storage facility. Such system requires a natural landscape with the low-grade slope to prevent the wheel pair from sliding on the railroad tracks, and with the difference in height of a landscape over hundreds of meters for an industrial scale of stored energy. A lesser slope leads to an increase in the length of the travel of the weights and the area of the required land allocation. With the increased length of the travel of the weights the force of friction also increases thereby the efficiency decreases.

PCT/US2011/037252 to Fyke et al., discloses a system comprising a belt system having a first end portion located at a first elevation and a second end portion located at a second elevation, that is higher than the first elevation. The system also includes a plurality of mass carriers supported by the belt system and one or more motor generators coupled with the belt system and with an energy grid. The system also includes two mass pile areas configured to store mass medium positioned at the first and second elevation. The system can store energy by transferring mass medium from the first mass pile area to the second mass pile area, and can generate energy by transferring mass medium from the second mass pile area to the first mass pile area. Such system requires a natural landscape with the low-grade slope to prevent the belt from sliding on the surface of the mass carriers, and with the difference in height of a landscape over hundreds of meters for an industrial scale of stored energy. A lesser slope leads to an increase in the length of the travel of the weights and the area of the required land allocation. With the increased length of the travel of the weights the force of friction also increases thereby the efficiency decreases.

The most efficient from the point of view of cycle efficiency and the build-up area are systems that accumulate energy by strictly a vertical movement of weights. For example, PCT/GB2012/051604 to Peter Fraenkel et al. and CN206555081U are directed to the accumulation of energy by the vertical movement of one very large (weighing several thousand tons) cargo. The weight of the cargo puts extremely high demands on the strength characteristics of the mechanical assemblies of such systems, as well as the demands for safety precautions. In addition, if any repair or maintenance is needed, the system must be fully decommissioned.

Another solution disclosed in the application GB2549743A to Dennis Herbison Francis provides a modular system of several energy cells in which a single cable vertically moves a multitude of weights. This system employs a block and tackle with the high number of rope loops in order to reduce the lifting force, thereby resulting in a significant reduction in the system efficiency.

Accordingly, some systems for storing the electric energy require a large amount of water, some systems for storing the electric energy require specific soil types, some systems for storing the electric energy require a specific landscape with substantial elevation differences and large territorial commitments. Structure of other systems results in substantial reduction of efficiency and significant damage in case of an emergency. As a result, to solve the problem of keeping the balance between the generated and consumed energy in an electric grid, it is necessary to balance monetary and requirement for electric energy generation concerns.

The common need is to construct a system for storing the electric energy close to a location where the problem of the imbalance between the generated and consumed energy is the key issue, rather than at a location that has favorable landscape or soil type and covers a large territory.

Further, there exists a need for an cost-effective, efficient and low capital cost system storing the electric energy.

Even further, a solution is needed for a system for storing the electric energy that can provide low construction and operational costs, while addressing the imbalance of the demand and consumption of electricity in the large power system.

It is, therefore, an object of this disclosure to disclose a cost effective and efficient industrial system for electric energy storage by employing the vertical movement of weights that allows addressing the imbalance of the demand and consumption of electricity in the large power system.

Yet another object of the present disclosure is to offer a cost efficient and effective system that allows for low operating costs and improved reliability. These objectives are achieved by disclosed herein the cost efficient and effective industrial system for electric energy storage that employs a vertical movement of weights in order to store the electric energy.

SUMMARY OF THE INVENTION

In view of the foregoing and other exemplary problems, drawbacks, and disadvantages of the conventional methods and systems, an exemplary feature of the present invention is to provide a cost efficient and effective industrial system for electric energy storage by employing vertical movement of weights.

The present invention relates to an industrial system for electric energy storage where the system is configured to charge or discharge by vertically moving a plurality of weights. The system has at least one energy cell.

The energy cell comprises a carriage that vertically moves the plurality of weights and stores the weights on either an upper portion or a lower portion of the energy cell. A trolley of the energy cell moves the carriage horizontally within the energy cell from one shaft to another. Each consecutive shaft is employed for vertical movement of the plurality of weights. During the horizontal movement of the carriage by the trolley, the carriage does not carry the weights. The trolley moves on a top bearing frame. The top bearing frame is preferably positioned on the top of a bearing structure. The carriage and the trolley are operably coupled by a belt with two tensioners. The belt is connected to a main drive. The main drive facilitates the vertical movements of the carriage with or without the weights. The horizontal movement of the trolley, when the trolley is engaged with the carriage, is facilitated by a carriage energy source.

The energy cell preferably has two carriages and two trolleys.

The top bearing frame preferably has groves or rails to facilitate the horizontal movement of the trolleys.

The system further comprises vertical weight-guides configured to maintain stability of the weights during vertical movement of the weights. The weight-guides is also configured to store the weights in the lower portion.

According to the exemplary embodiment of the present disclosure, at any given time, any of the weights can be located in one of the three possible positions: fixedly stored to the upper portion, fixedly stored to the lower portion, or moving vertically.

Each carriage, at any given time, is in one of the five positions: at rest in the upper portion, at rest in the lower portion, moving vertically with the weight, moving vertically without the weight, or moving horizontally in the upper portion without the weight on the trolley. More specifically, within the single energy cell: 1) if two carriages are at rest, one of the carriages is located in the upper portion and the second carriage is located in the lower portion; 2) if one of the carriages is moving upwards, the second carriage is moving downwards wherein during the vertical movement one of the carriages carries the weight, and the second carriage does not include the weight; 3) if one of the carriages is moving horizontally in the upper portion without the weight on the trolley, the second carriage is position in the lower portion at rest.

According to an embodiment of the present invention, the industrial system further comprises a storage control system configured to monitor, collect and provide diagnostic information about the industrial system, to provide operational control, and to receive and execute commands from an electrical power grid operator.

According to an embodiment of the present invention, each energy cell further comprises an energy cell control system configured to communicate and receive data from the carriages, the main drive, the two belt tensioners, and storage control system.

Each weight has a weight-bearing frame and a weight body that is fixed under the weight-bearing frame.

The present disclosure also includes a method for storing electric energy. The method comprises (i) moving vertically the plurality of weights using a carriage and fixedly storing the weights on either the upper portion or the lower portion; and (ii) connecting the main drive of the industrial system to the power grid in order for the power grid to receive or supply the electric energy. The energy cell being configured to charge or discharge the industrial system.

Other features and advantages of the invention will appear from the following description in which the preferred embodiments have been set forth in detail in conjunction with the accompanying drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The word "exemplary" is used herein to mean "serving as an example, instance, or illustration." Any embodiment described herein as "exemplary" is not necessarily to be construed as preferred or advantageous over other embodiments. Likewise, the term "embodiments of the invention" does not require that all embodiments of the invention include the discussed feature, advantage or mode of operation.

The terminology used herein is for the purpose of describing particular embodiments only and is not intended to be limiting of embodiments of the invention. As used herein, the singular forms "a", "an" and "the" are intended to include the plural forms as well, unless the context clearly indicates otherwise. It will be further understood that the terms "comprises," "comprising," "have," "having," "consist", "consisting", "includes" and/or "including," when used herein, specify the presence of stated features, integers, steps, operations, elements, and/or components, but do not preclude the presence or addition of one or more other features, integers, steps, operations, elements, components, and/or groups thereof.

According to the present disclosure, a cost effective industrial system for electric energy storage that employs vertical movement of weights in order to generate and/or store the electric energy. The system is configured to respond quickly and efficiently to the needs for the electric energy.

Figure 1:
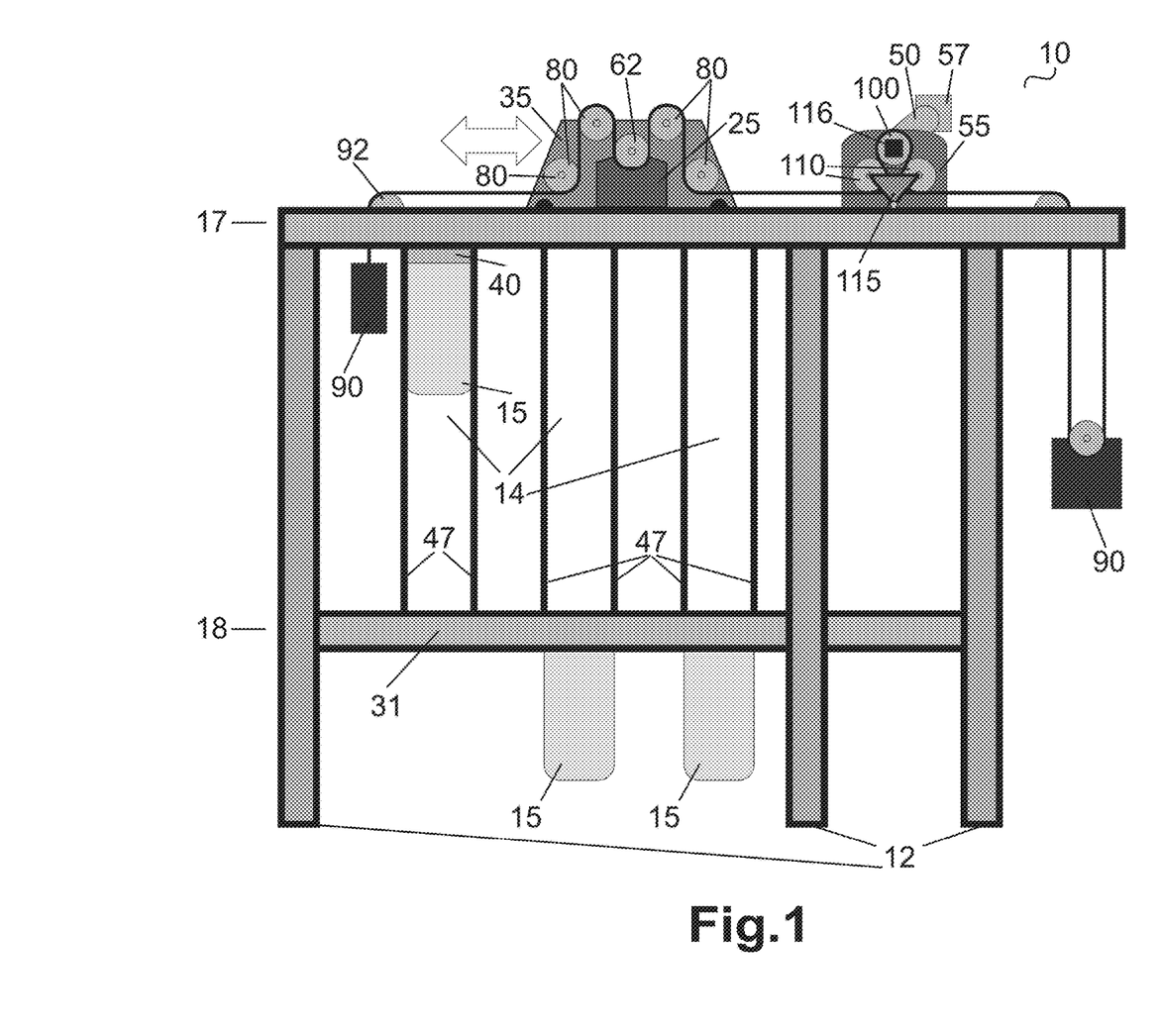
FIG. 1 is a schematic representation of the energy cell of an industrial system for electric energy storage according to the present disclosure.
Figure 2:
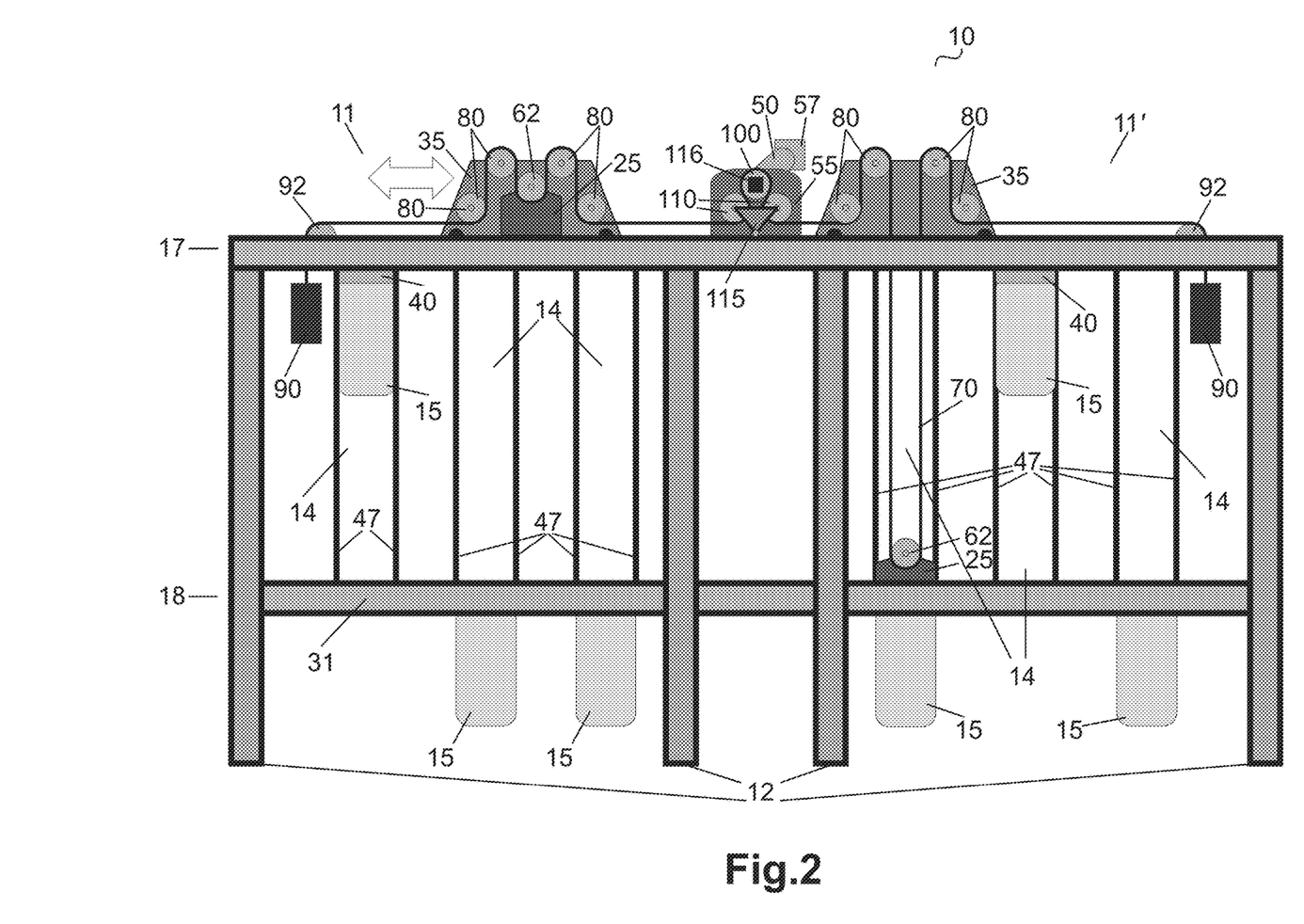
FIG. 2 is a schematic representation of the energy cell according to another embodiment of present disclosure in which the energy cell has two carriages and two trolleys
Figure 3:
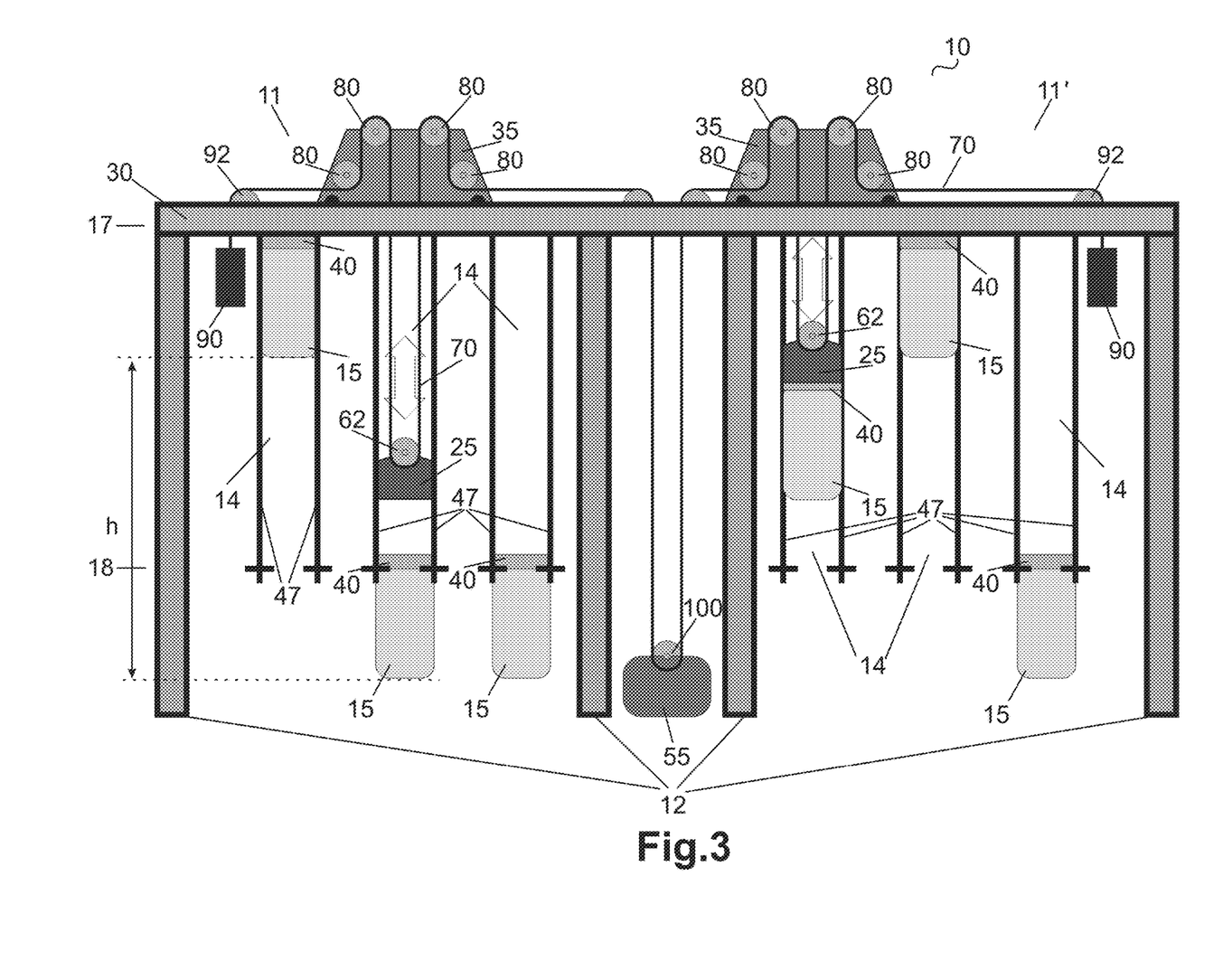
FIG. 3 is a schematic representation of yet another embodiment of the energy cell which has two carriages and two trolleys according to the present disclosure.

The industrial system comprises of multiple energy cells 10 configured for electric energy generation and storage, embodiments of the energy cells are shown in FIGS. 1, 2 and 3. Each energy cell 10 consists of sequential shafts 14.

According to an embodiment illustrated by FIG. 1, the energy cell 10 has a single carriage 25 and a single trolley 35. The energy cell 10 described in this paragraph and shown on FIG. 1, while having reduced energy capacity, provides for inexpensive and compact energy storage solution. FIG. 1 shows illustrates the carriage 25 of the energy cell moving horizontally without a weight 15 in the upper portion 17 on a trolley 35 of the energy cell 10. Arrows show the directions of the carriage movement of the trolley.

In another embodiments of the present invention shown on FIGS. 2 and 3, each energy cell includes two half-cells 11,11' that are separated by a main drive 55. Each half-cell 11,11' includes one corresponding carriage 25 for vertical movement of the weights 15 within a designated shaft. The carriage 25 is mobile and can be moved horizontally via a trolley 35 from one shaft to another.

FIG. 2 illustrate one of the carriages 25 moving horizontally without the weights 15 in the upper portion 17 on the trolley 35, and the other carriage 25 is positioned in the lower portion 18 at rest. Arrows show the directions of the carriage 25 movement on the trolley 35 in the state.

FIG. 3 illustrates one of the carriages 25 is moving upwards, while the second carriage 25 is moving downwards. During the vertical movement one of the carriages 25 carries the weight 15, and the second carriage 25 does not carry the weight 15. Arrows show the directions of the carriages 25 movement in this configuration.

All the components of the system (the main drive, carriages, trolleys, and weights) are operably connected by a belt 70.

The industrial system has a top bearing frame 30 (further described below) for fixing weights 15 in an upper portion 17. According to embodiments shown on FIGS. 1 and 2 the industrial system additionally has a bottom bearing frame 31 (further described below) for fixing weights 15 in a lower portion 18.

In yet another embodiment shown on FIG. 3, the industrial system includes weight-guides 47 (further described below) that are employed to store the weight 15 in the lower portion 18. At any given time, any of the weights 15 can be in one of the three possible positions: at the upper portion 17, at the lower portion 18, or moving vertically.

Accordingly, each carriage 25, at any given time, is in one of the five positions: (i) at rest in the upper portion 17; (ii) at rest in the lower portion 18; (iii) moving vertically with the weight 15; (iv) moving vertically without the weight 15; or (v) moving horizontally in the upper portion 17 without the weight 15 on the trolley 35.

More specifically, as illustrated in FIGS. 2 and 3, within the single energy cell 10, if two carriages 25 are at rest, one of the carriages 25 is located in the upper portion 17 and the second carriage 25 is located in the lower portion 18. If one of the carriages 25 is moving upwards, the second carriage 25 is moving downwards. During the vertical movement one of the carriages 25 carries the weight 15, and the second carriage 25 does not have the weight 15. If one of the carriages 25 is moving horizontally in the upper portion 17 on the trolley 35, the second carriage is position in the lower portion 18 at rest. When the carriage 25 is moved horizontally via trolley 35, the carriage 25 does not carry any weight 15. In other words, during the horizontal movement of the carriage the weight is not attached to the carriage. Each carriage 25 can elevate or lower its corresponding weights 15 (positioned in the same half-cell). The weights 15 moving upwards charge the system; while the weights moving downward discharge the system (i.e. the system produces electric energy). Some of the weights 15 may be attached to the upper portion of the energy cell and serve as a reserve.

As shown on FIGS. 2 and 3, the upper portion 17 comprises a top bearing frame 30. The top bearing frame 30 can be used for fixing the weights 15 in the upper portion 17 in the charged position. A presence of the rigid top bearing frame 30 allows to evenly distribute the load applied by the weights 15 on a bearing structure 12 of the industrial system. Preferably, the top bearing frame 30 may also include guides or rails 13 (shown on the FIGS. 5A and 5B) in order to allow for a secure and stable horizontal movement of the trolleys 35.

The energy cell 10 further includes vertical weight-guides 47. The weight-guides' 47 upper ends are fixed to the top bearing frame 30. The weight-guides 47 configured to maintain the motion stability of weights 15 during vertical movement of the weights 15. Preferably, there are at least two weight-guides 47 for each shaft 14.

As shown on FIG. 3 the weight-guides 47 may be employed to store the weights 15 in the lower portion 18. In this case the weight-guides' 47 lower ends should be configured for fixing the weights 15.

The weight-guides 47 can be manufactured as rope or rod from metal (e.g. steel) or any other material with suitable strength characteristics.

In another embodiments of the present disclosure, shown on FIGS. 1 and 2, the industrial system further includes a bottom bearing frame 31. The bottom bearing frame 31 is constructed at the lower portion of the energy cell 10 at a distance from the ground exceeding the length of the weight 15. The bottom bearing frame is substantially similar in construction and design as the top bearing frame 30, except that the bottom bearing frame 31 does not include guides or rails.

Referring to FIGS. 1 to 3, each of the weights 15 includes a weight frame 40.

The weight frame 40 is a frame that is configured to support the substantial mass (tens of tons) of the weight 15, to fix the weight 15 on the carriage 25 and to fix the weight on either the upper portion 17 or the lower portion 18. Weight frame 40 can be manufactured from metal (e.g. steel) or other known material with suitable strength characteristics. The weight frame 40 can be rectangular or any other suitable shape.

In one of the embodiment of the present invention, in order to provide an inexpensive solution for configuring the weights 15, a polypropylene bag with a medium can be used to create a substantial mass for the weights 15. In this case the weight further includes the straps for attaching the bag (not shown) to the weight frame 40.

In addition, a plurality of similar or different sized bags can be used. In order to connect the bags straps can be used for attaching the bags to the weight frame 40 as well as attaching one bag to another.

The bags or another storage of mass solution, for example, a containers, can be filled with any solid material in order to obtain a desirable mass. Also, a pallet with massive solid blocks can be used in order to obtain a desirable mass. The material can be rock, gravel, dirt, sand, pulverized asphalt, concrete, mine tailings, water and/or any other man-made or natural occurring material.

To improve the cost efficiency of the system, economical materials, such as those already existing at a site or location of the construction of the system, may be preferred. For example, at certain sites rock, gravel, dirt, and/or mine tailings may be locally available. In addition, it is possible to use local soil extracted from the excavation for the foundation of the industrial system bearing structure 12.

According to an embodiment of the present disclosure, referring to FIG. 2, the main drive 55 is placed between the two half-cells 11, 11', on the top bearing frame 30. The main drive 55 includes an electric motor-generator 50, a drive pulley 100, friction enhancer 115 with a friction enhancer pulleys 110. The belt 70 partially encircles the main drive pulley 100 and the friction enhancer pulleys 110. The main drive 55 also houses a main drive control system 57. The main drive 55 may also include a main drive brake system 116.

In another embodiment shown on FIG. 3, the main drive 55 is placed on the ground between the two half-cells 11, 11'.

According to the present disclosure, the system employs the carriage 25 to facilitate the vertical movement of the weights 15. An embodiment of the carriage shown in more detail on FIG. 4. Each energy cell 10 preferably has two carriages 25. It is understood that the energy cell 10 can comprise only one carriage 25 as shown on FIG. 1 or comprise more than two carriages (not shown).

Figure 4:
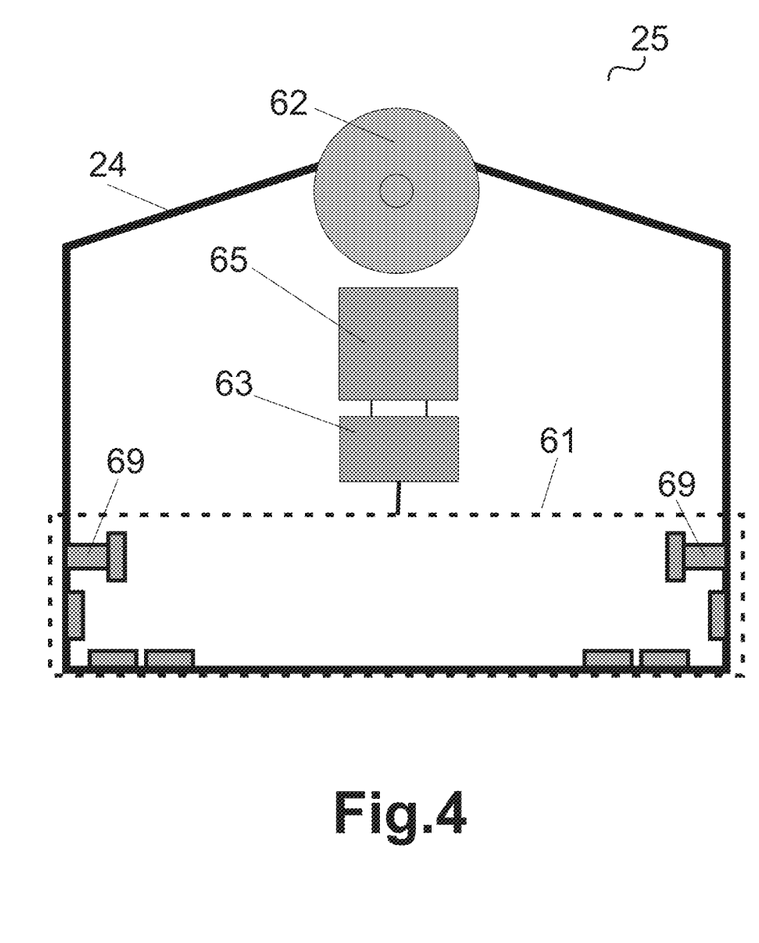
FIG. 4 is a schematic representation of a carriage of the energy cell of the industrial system for electric energy storage according to the present disclosure.

More specifically, the carriage 25 provides the vertical movement of the weights 15 in each shaft and facilitates arranging the weights 15 on either the top bearing frame 30 or in the lower portion 18.

In order to move the weight 15 within the shaft, the carriage 25 is equipped with a carriage pulley 62 functioning in the vertically moving position as free-rolling movable pulley coupled with the belt 70. Also, in order to reduce the lifting force, the carriage 25 can be equipped with two or more carriage pulleys.

The carriage pulley 62 functioning as a drive pulley provides for the horizontal movement of the carriage 25. In such instance, the carriage 25 is carrying the non of the weights 15, that are securely fixed at the top bearing frame 30 or in the lower portion 18. The carriage 25 is transported horizontally by the dedicated trolley 35 (further described below). This horizontal movement allows for the carriage 25 to vertically move the weights 15 in different shafts of each half-cells 11,11' of the energy cell 10.

The energy capacity of the industrial system (E) is determined by the product of the total mass of weights (M) by the lifting height (h—shown on the FIG. 3): $E=M*g*h$, where $g$ is the acceleration of gravity.

The cost of the weights, is relatively small. The increase of total weight number, and accordingly weight mass does not require increasing the number of carriages. On the other hand, the cost of the carriages is relatively higher, but one additional carriage can significantly increase the energy capacity of the industrial system which increases the cost-effectiveness of the present invention by decreasing unit capital cost of the system.

In an embodiment of the present invention, the carriage 25 further comprises a carriage energy source 65. For example, the carriage energy source 65 is an motor-generator with the matrix frequency converter. The carriage energy source working in a motor mode is used to provide for the horizontal movement of the carriage 25 on the trolley 35 the energy source 65 being powered by a carriage energy accumulator 63. The carriage energy accumulator 63 is also used to power a carriage drive system 61 and a carriage control system 215. The carriage energy accumulator 63 is charged when the carriage 25 moves vertically receiving power from the carriage energy source 65 working in a generator mode and converts the energy of the mechanical vertical movement of the carriage 25 into electrical or potential energy of compressed gas (depending on the type of battery).

In order to provide for (i) the weight fixation function to the top bearing frame 30 or in the lower portion 18, (ii) the trolley wheel 32 position switching, (iii) the locking of the trolley 35 on the top bearing frame and (iv) the coupling of the carriage 25 and the weight 15, the carriage 25 has a carriage drive system 61. It is understood that various suitable drive systems can be used for fulfilling the functions described in this paragraph, for example based on pneumatic or electric linear drive systems.

The carriage 25 also has a coupling mechanism 69 for fixing the weight 15 to the carriage 25.

In addition, the carriage 25 includes a carriage frame 24 for supporting and arranging the components of the carriage 25 described in the preceding paragraphs.

According to the present disclosure, the system employs the trolley 35 to facilitate the horizontal movement of the carriage 25, when the carriage 25 holds non of the weights 15. An embodiment of the trolley shown in more detail on FIGS. 5A and 5B. Each half-cell 11,11' has a dedicated trolley 25. Consequently, according to preferable embodiment of the present disclosure, each energy cell 10 of the system uses two trolleys 35. In another embodiment shown on FIG. 1, the energy cell may use only one trolley 35.

Figure 5A:
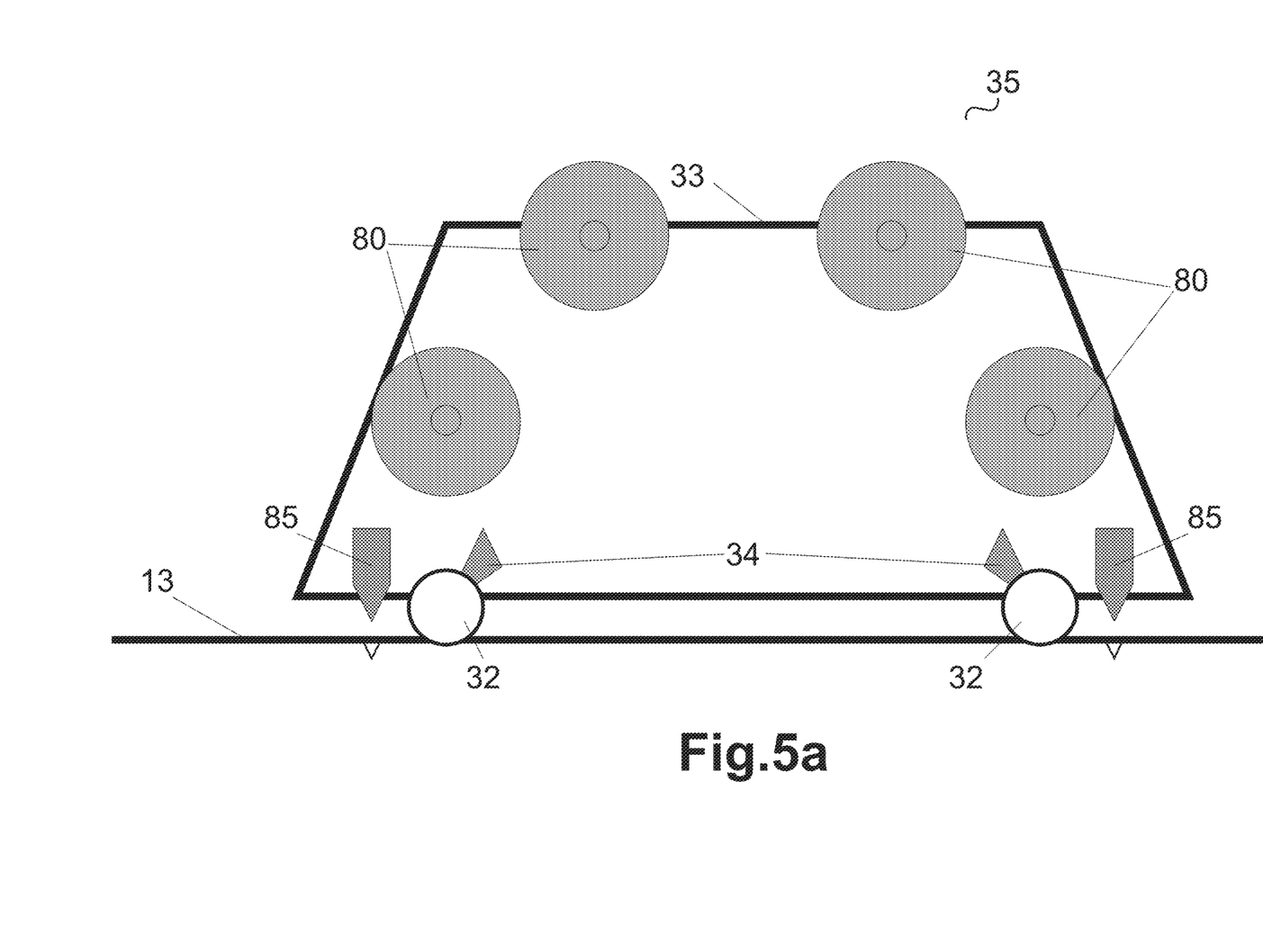
FIG. 5A is a schematic representation of the trolley according to the present disclosure, where the trolley's wheels are in such a position that the trolley is able to move horizontally.
Figure 5B:
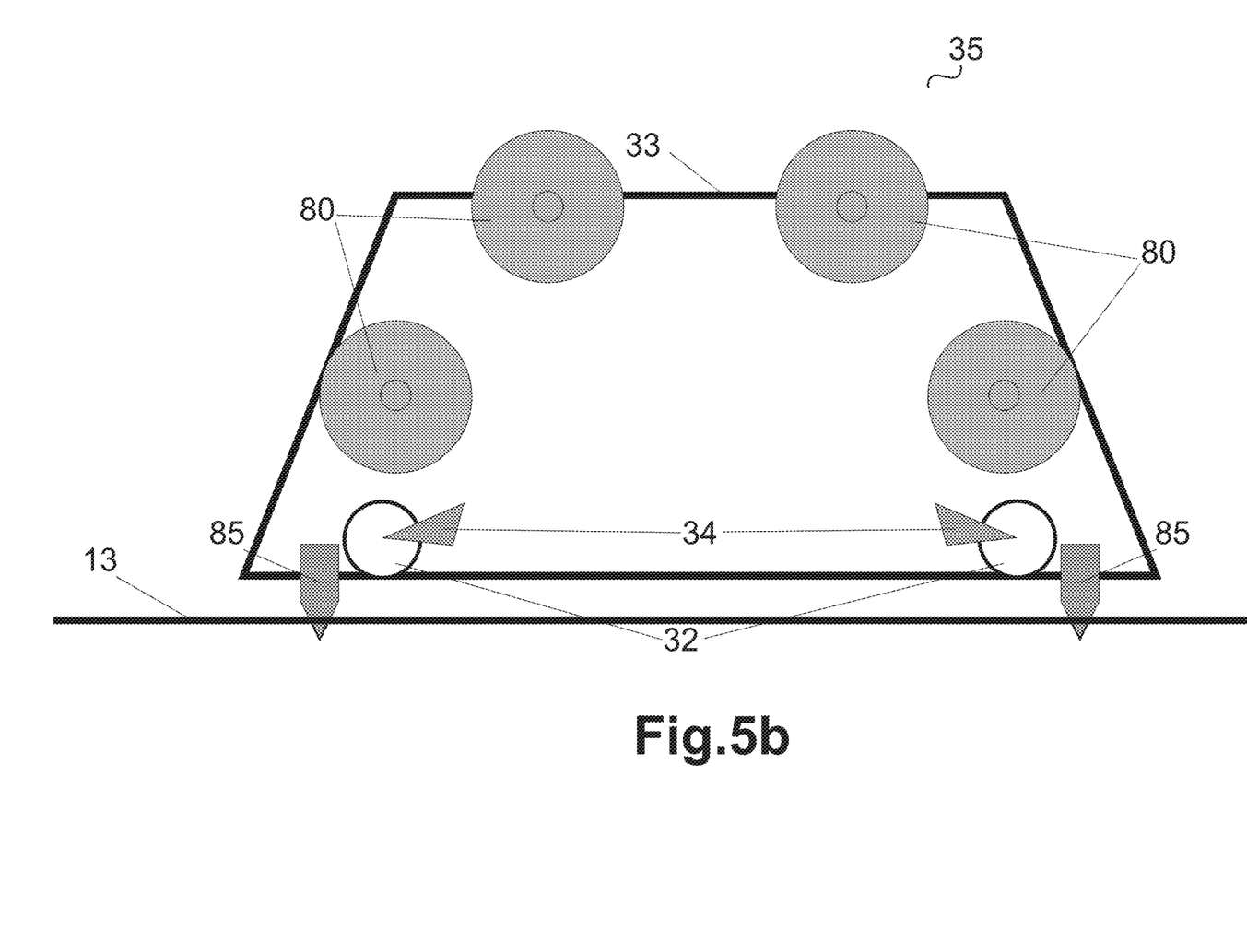
FIG. 5B is schematic representation of the trolley according to the present disclosure, where the trolley's wheels are in such a position that the trolley frame is fixed on a top bearing frame of the industrial system.

According to an embodiment of this disclosure, as shown on FIGS. 5A and 5B, the trolley 35 is securely and moveably located on the top bearing frame 30. The trolley 35 is a frame 33 (e.g. metal) with wheels 32. The trolley 35 moves horizontally from the main drive 55 to an one of the belt tensioners 90 (and back to the main drive 55) along guides of the top bearing frame 30 within one of the half-cells.

In an embodiment, the trolley 35 has at least two similar free-rolling trolley pulleys 80. Preferably, the trolley 35 has four trolley pulleys 80 as shown on the FIGS. 5A and 5B. The first trolley pulley 80, which is proximate to the main drive 55, directs the belt 70 vertically towards the next trolley pulley 80 and then towards the carriage's pulley 62 from where the belt 70 is received by the next trolley pulley 80 and then is received by the last trolley pulley which is proximate to one of the belt tensioners 90. The last trolley pulley then directs the belt 70 horizontally to one of the belt tensioners 90. In this case, the carriage pulley 62 is placed between the trolley pulleys 80. It addition, the trolley 35 may include a trolley locking mechanism 85.

FIG. 5A illustrates the trolley 35 during the horizontal movement along the guides of the top bearing frame 30 (the carriage 25 is not shown here). FIG. 5B illustrates the trolley 35 in the stationary position when the trolley locking mechanism 85 is engaged. More specifically, the wheels 32 configured to be in a first position and a second position. When the wheels 32 are in the first position, the trolley is able to move horizontally on the top bearing frame, and when the wheels 32 are in the second position, the trolley frame is fixed on the top bearing frame 30 via the trolley locking mechanism 85. The trolley wheel position can be switched via a wheel position switching mechanism 34 (e.g. hinged mechanism). The trolley 35 is configured to bear a mass of the one weight 15 and the one carriage when the wheels are in the second position and the frame is fixed on the top bearing frame 30.

Referring to FIGS. 1-3, according to an embodiment of the present disclosure, the belt 70 operably connects the main drive 55, the trolley 35 and the carriage 25.

According to an embodiment of the present disclosure each of two ends of the belt 70 is secured by a belt tensioner 90. These tensioners 90 are stationary placed above the ends of bearing structure 12 of the energy cell 10 as shown on the FIGS. 1, 2, and 3. The belt tensioner is configured to provide a predetermine tension the belt in the states between the movements of the weights and to securely fix the end of the belt during the movement of the weight. The belt tensioners can be manufactured as a brace weight with a belt locking mechanism.

More specifically, referring to the illustration on FIG. 3, one end of the belt 70 is secured by a first belt tensioner 90. The belt 70 connects through a belt tensioner pulley 92, the trolley pulleys 80 of the first trolley 35 that are proximal to the first belt tensioner 90, then to the carriage pulley 62 of the first carriage 25, the next trolley pulleys 80 of the first trolley 35, the main drive pulley 100, the friction enhancer pulleys 110, the proximal to the main drive pulleys 80 of the second trolley 35, carriages pulley 62 of the second carriage 25; the next trolley pulleys 80 of the second trolley 35, the second belt tensioner pulley 92, and terminating with a second belt tensioner 90.

Preferably, the belt 70 has a flat configuration. This increases the efficiency and durability of the energy cell 10. The flat surface of the belt 70 allows for pulley with a smaller diameter than the diameter for pulleys that are necessary for a round belt. This reduces the main drive's 55 reduction coefficients as well as to stabilizes the belt by laterally reducing its wear and tear through using the pulleys.

The belt 70 can be made of any suitable and cost effective material. For example, the belt 70 can be a steel core belt in polymer coating.

The configuration of the system, as shown on the FIGS. 2 and 3, allows for the two carriages 25 of the energy cell 10 move vertically in opposite directions. If one of the carriages 25 moves horizontally via the trolley 35 along the top beating frame 30, the second carriages 25 is at rest in the lower portion 18 of the energy cell 10.

According to the present disclosure, the system transforms the mechanical power of the moving weights 15 through the electric motor-generator 50 of the main drive 55 coupled with a main drive control system 57 into the electric power. The electric power is then delivered to a power grid 20 through a substation with a switchgear 120. The main drive control system can be manufactured as matrix frequency converter with automated control system.

According to an embodiment of the present disclosure, electric motor-generator 50 is a synchronous alternating current induction motor.

The frequency converter serves the motor 50 only at the initial stages of the weights' 15 vertical motion both in storing and generation modes. When the weights 15 reach their required velocity, so as the motor 50 reaches its nominal rate of rotation, the converter can be shunted by an active conductor to shift to the bypass mode. This approach allows installing one frequency converter for several motors 50, but requires the use of a mechanical reductor in every main drive 55.

Figure 6:
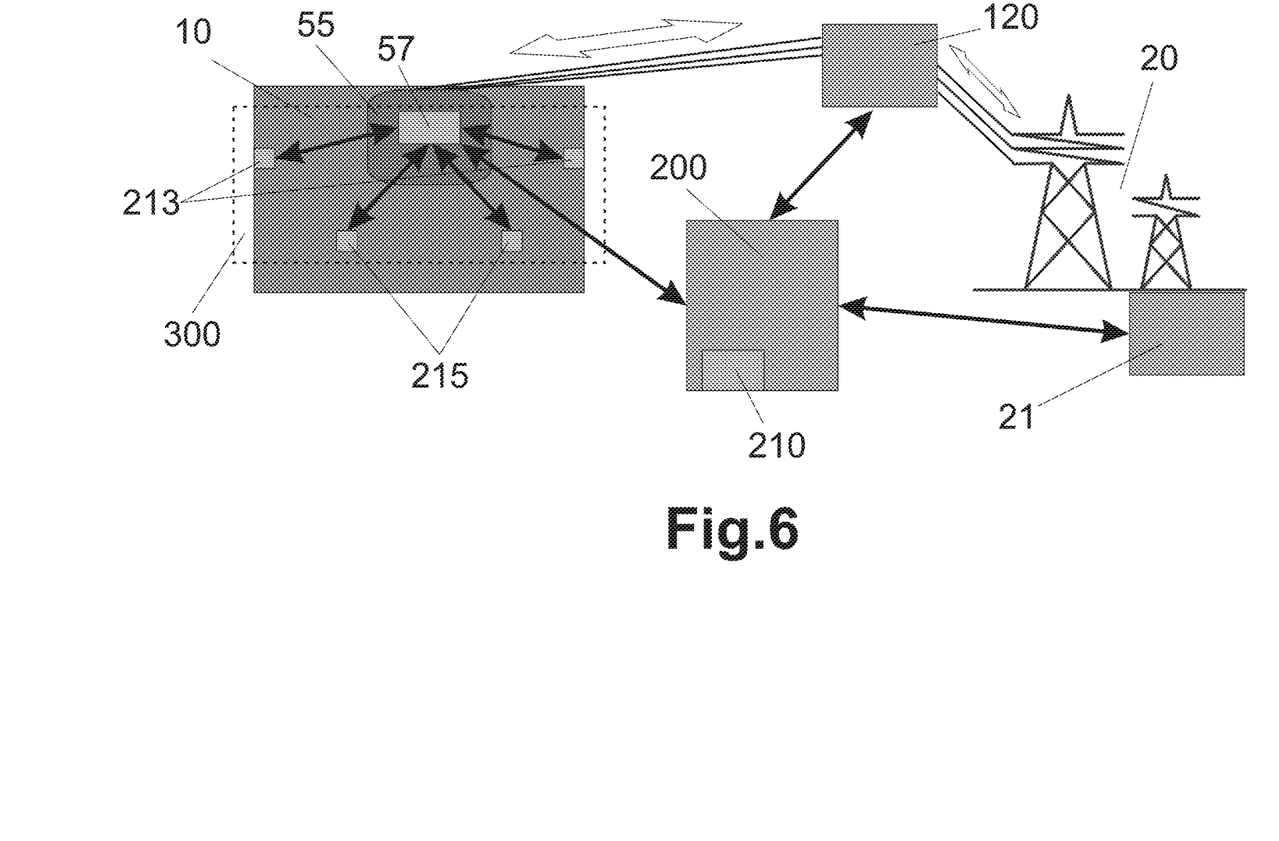
FIG. 6 is a schematic representation of the industrial system for electric energy storage according to the present disclosure that is connected to a power grid.

According to the present disclosure, as shown on FIG. 6, the system further includes a storage control system 200 configured to monitor and provide diagnostic information about the industrial system, to provide operational control and to receive and execute commands from an electrical power grid operator 21. For the collection and storage of data, the storage control system 200 may contain a data collection system 210. For simplicity, the industrial system consisting of only one energy cell is shown on FIG. 6. The black arrows show possible directions of information flow, while the white arrows show possible directions of energy flow.

Further, the storage control system 200 can be configured to control the main drive 55, the speed and direction of motion of the weights 15.

Accordingly, the storage control system 200 controls when the energy is being stored and/or generated and the amount of the energy being stored and/or generated. The storage control system 200 can be electronically or manual controlled or, alternatively can be operated via a computer software protocol.

Each energy cell 10 also preferably includes an energy cell control system 300, configured to communicate and receive data from the carriage control systems 215, the main drive control system 57, the belt tensioner control systems 213, and the storage control system 200. The communications between, for example, the main drive control system and the carriage control system 215 may be effectuated through radio signal, digital optical signal, and the like.

Additionally, the energy storage system can include sensors (not shown) embedded in any of the components of the system, for example, the main drive 55, the carriage 25 or the trolley 35, that can provide data signals, information or feedback to the storage control system 200 or the energy cell control system 300. For example, the sensors can be configured to monitor the velocity, acceleration, or direction of the weights 15 or any other desired system parameters.

The disclosed embodiments allow a method for providing industrial scale electric energy storage services using the vertical movements of the weights that in turn allow supplying the power grid with the electricity that precisely matches the demand for the electric power.

Upon receiving a command from an electrical power grid operator 21 for the electric energy, in a selected set of the energy cells 10 the weights 15 are vertically moved by the dedicated carriage 25 to store or generate electrical energy. The weights 15 moving upwards at any moment of time charge the storage system, while the weight 15 moving down discharge the system, so the system produces electric energy. Some of the weights 15 remain attached to the upper bearing frame 30 to serve as a reserve.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. An industrial system for electric energy storage having a top bearing frame is placed on the top of a bearing structure, the system comprising at least one energy cell wherein the energy cell comprises:
   a plurality of weights;
   a carriage configured to vertically move at least one weight of the plurality of weights and to fixedly store the weight on either an upper portion or a lower portion;

a trolley configured to horizontally move the carriage along the top bearing frame;
a belt having two belt tensioners, the belt is operably coupled to the carriage and the trolley; and
a main drive coupled to the belt and configured to move the carriage,
wherein the system is configured to charge by moving the at least one weight of the plurality of weights from the lower portion to the upper portion, and
wherein the system is configured to discharge by moving the at least one weight of the plurality of weights from the upper portion to the lower portion.

2. The industrial system of claim 1 further comprising a bottom bearing frame.

3. The industrial system of claim 1 further comprising a vertical weight-guide having an upper end, the upper end is fixed on the top bearing frame and configured to maintain the motion stability of the at least one weight of the plurality of weights during vertical movement of the at least one weight of the plurality of weights.

4. The industrial system of claim 3, wherein the weight-guide configured to fixedly store the at least one weight of the plurality of weights in the lower portion.

5. The industrial system of claim 1, wherein the main drive is fixedly positioned on the top bearing frame.

6. The industrial system of claim 1, wherein the main drive is fixedly positioned on a bearing structure ground.

7. The industrial system of claim 1, wherein the industrial system further comprises:
a storage control system configured to monitor and provide diagnostic information about the industrial system, to provide operational control and to receive and execute commands from an electrical power grid operator; and
a data collection system.

8. The industrial system of claim 7, wherein the energy cell further comprises an energy cell control system configured to communicate and receive data from the carriage the main drive, the two belt tensioners, and the storage control system.

9. The industrial system of claim 1, wherein the top bearing frame further comprises guides configured to allow for horizontal movement of the trolley.

10. The industrial system of claim 1, wherein the at least one weight of the plurality of weights comprises:
a weight-bearing frame; and
a weight body, fixed under the weight-bearing frame.

11. The industrial system of claim 1, wherein the carriage comprises:
a carriage frame;
at least one carriage pulley;
a carriage controller;
a carriage energy source;
a carriage energy accumulator;
a coupling mechanism for fixing the weight to the carriage; and
a carriage drive system.

12. The industrial system of claim 1, wherein the trolley comprises:
a trolley frame;
wheels configured to be in a first position and a second position, when the wheels are in the first position, the trolley is able to move horizontally on the top bearing frame, and when the wheels are in the second position, the trolley frame is fixed on the top bearing frame via a trolley locking mechanism;
at least two similar free-rolling trolley pulleys; and
wheel position switching mechanism,
wherein the trolley is configured to bear a mass of the weight and the carriage when the wheels are in the second position and the trolley frame is fixed on the top bearing frame.

13. The industrial system of claim 1, wherein the main drive comprises:
an electric motor-generator;
a drive pulley;
a friction enhancer;
a main drive control system; and
a main drive brake system.

14. The industrial system of claim 1, wherein the belt is flat.

15. An industrial system for electric energy storage having a top bearing on the top of a bearing structure, the system comprising:
a plurality of weights;
at least two carriages configured to vertically move at least one weight of the plurality of weights and to fixedly store the weight on either a top portion or a bottom portion;
at least two trolleys configured to horizontally move the at least two carriages along the top bearing frame;
a belt having two belt tensioners, the belt is operably coupled to the carriages and the trolleys; and
a main drive coupled to the belt and configured to move the carriages wherein the system is configured to charge or discharge the system by moving the at least one weight of the plurality of weights from the lower portion to the upper portion or from the upper portion to the lower portion.

16. A method for electric energy storage comprising:
moving vertically a plurality of weights using a carriage and fixedly storing the weights on either an upper portion or a lower portion;
connecting a main drive of an industrial system for electric energy storage to the power grid in order for the power grid to receive or supply the electric energy, wherein
the main drive configured to move the at least one weight of the plurality of weights to charge or discharge the industrial system,
wherein the system is configured to charge by moving the at least one weight of the plurality of weights from the lower portion to the upper portion, and
wherein the system is configured to discharge by moving the at least one weight of the plurality of weights from the upper portion to the lower portion.

* * * * *